United States Patent [19]

Yoshida et al.

[11] 4,098,840

[45] Jul. 4, 1978

[54] THERMOSETTING RESIN COMPOSITION

[75] Inventors: Masaru Yoshida; Isao Kaetsu; Hiroshi Okubo; Akihiko Ito, all of Takasaki, Japan

[73] Assignee: Japan Atomic Energy Research Institute, Tokyo, Japan

[21] Appl. No.: 603,991

[22] Filed: Aug. 12, 1975

[30] Foreign Application Priority Data

Aug. 21, 1974 [JP] Japan ............................ 49-95096

[51] Int. Cl.² .................. C08L 83/06; C08L 83/08; C08L 43/04; C08F 2/46

[52] U.S. Cl. .................. 260/827; 528/30; 204/159.13; 428/429; 428/447; 428/450; 526/29; 526/263; 526/279

[58] Field of Search .......... 260/827, 46.5 E, 46.5 UA; 106/13; 526/29; 428/429, 447, 450

[56] References Cited

U.S. PATENT DOCUMENTS

| | | | |
|---|---|---|---|
| 3,088,847 | 5/1963 | Pines | 260/827 |
| 3,468,836 | 9/1969 | Sekmakas | 260/827 |
| 3,484,333 | 12/1969 | Vanderbilt | 260/827 |
| 3,865,619 | 2/1975 | Pennewiss et al. | 106/13 |
| 3,933,407 | 1/1976 | Tu et al. | 260/827 |

*Primary Examiner*—Wilbert J. Briggs, Jr.
*Attorney, Agent, or Firm*—Ladas, Parry, Von Gehr, Goldsmith & Deschamps

[57] ABSTRACT

A thermosetting resin composition comprising (A) the hydrolysate of an alkoxysilane represented by either of the general formulas:

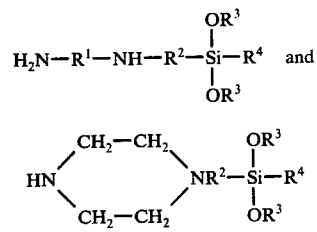

wherein $R^1$ and $R^2$ are respectively a divalent group, $R^3$ is a lower alkyl and $R^4$ is $R^3$ or $OR^3$ and (B) a polymer or copolymer of monomers represented by the general formula

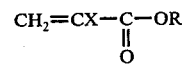

wherein R is a hydroxyalkyl and X is hydrogen or methyl is provided. This composition forms a transparent anti-fogging abrasion-resistant coating on the surface of glass, metals and synthetic resins.

14 Claims, No Drawings

THERMOSETTING RESIN COMPOSITION

BACKGROUND OF THE INVENTION

This invention relates to a thermosetting resin composition useful for forming a transparent anti-fogging abrasion-resistant coating on the surfaces of inorganic glass, metal and plastic materials.

Transparent materials are widely used in various fields, for example, for windowpanes of vehicles and buildings, materials for interior design, glasses of meters and gauges, lenses, etc., but most of the transparent materials used today are inorganic glass.

Inorganic glass is excellent in transparency, abrasion resistance, heat resistance, chemical resistance and so forth, and has a wide range of application. But inorganic glass has a serious drawback in that it collects moisture dewdrops on its surfaces when the temperature of the surfaces is below the dew point of the surrounding atmosphere, namely, when the surrounding air is saturated with water vapor. Because of this drawback, inorganic glass does not perform satisfactorily as windowpanes, lenses, glasses of meters and gauges, causing inconvenience to users.

On the other hand, transparent plastics are light and have good impact resistance, excellent workability and machinability, and therefore have come into use in a variety of fields, such as glass for vehicles, windowpanes for buildings, materials for interior decorations, meters and gauges; eyeglass, lenses for optical instruments, and so forth. Thus transparent plastics are now gradually replacing inorganic glass materials as is well known to those skilled in the art.

But, although the prior art transparent plastics are more resistant to breakage as compared with inorganic glass, they are quite inferior thereto in surface hardness, particularly in abrasion resistance, and thus they are easily scratched to shorten their life. This is a fatal defect which prevents them from wide acceptance.

Also, the prior art transparent plastic materials, as well as inorganic glass, have the same drawback in that they collect moisture to blur the surfaces thereof when the temperature of the surfaces is below the dew point of the surrounding atmosphere, namely, the surrounding air becomes saturated with water vapor, and thus they do not function satisfactorily as transparent materials when they are used for windowpanes of vehicles and buildings, lenses, mirrors, glasses of meters and gauges and the like.

Not only transparent materials but also the polished surfaces of metals are apt to be come blurred collecting dewdrops, and easily rust. So, it will be advantageous to coat the polished surfaces with a transparent, abrasion-resistant and anti-fogging material.

Some attempts have been made to form so-called anti-fogging coatings on the surfaces of transparent materials to make them resistant to fogging on dew-collection. An example thereof is a polymer or co-polymer of 2-hydroxyethyl methacrylate, which is applied as a coating on the surfaces of transparent materials. However, these prior art coatings are, without any exception, poor in abrasion resistance though they surely succeeded in providing the surface with fogging resistance to some extent. So, compared with plastic substrates, to say nothing of glass, such coatings are far easily scratched and thus do not meet the requirements for practical use.

An attempt to form a satisfactory coating by mixing a component well resistant to abrasion, but not resistant to fogging with another component with fogging resistance but poor in abrasion resistance, in many cases, results to give coatings with abrasion resistance and fogging resistance inferior to those of the respective components. Also in many cases, the two components are not completely compatible, so the resulting cured film does not give a transparent coating of fine uniform quality. Because of this defect, the transparency of the substrate is impaired, and composites wherein the coating and the substrate are firmly bonded cannot be obtained.

We have discovered a suitable combination of the two components in this invention after great efforts to select a component giving good abrasion resistance and a component giving good fogging resistance to achieve a desired effect.

An object of the present invention is to provide a thermosetting resin composition useful in forming coatings on the surfaces of inorganic glass, metal or plastic materials, which do not have the basic drawbacks of the prior art transparent materials and have high anti-fogging property as well as abrasion resistance, and thus have great value in practical use.

SUMMARY OF THE INVENTION

According to the present invention, there is provided compositions comprising a mixture of:

(A) 95 – 45% by weight of the hydrolysate of an alkoxysilane represented by either of the general formulas:

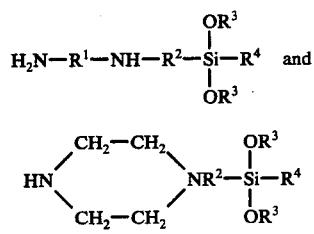

wherein:
$R^1$ is a divalent group selected from

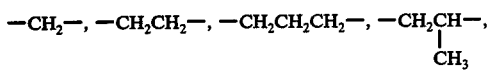

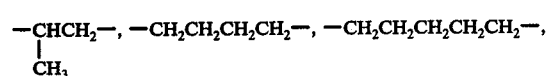

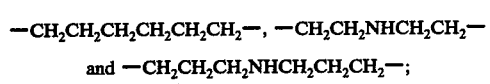

$R^2$ is a divalent group selected from

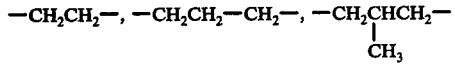

$R^3$ is any of methyl, ethyl, propyl and isopropyl; and $R^4$ is either of $R^3$ and $OR^3$, and (B) 5 – 55% by weight of a polymer or copolymer of monomers of the general formula:

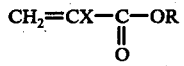

wherein X is either of hydrogen and methyl; and R is a monovalent group selected from

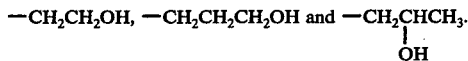

Further, there is provided composites comprising a substrate of a material selected from a group consisting of inorganic glasses, transparent organic synthetic resins and metals and a coating of a cured mixture comprising:

(A) 95 – 45% by weight of the hydrolysate of an alkoxysilane represented by either of the general formulas:

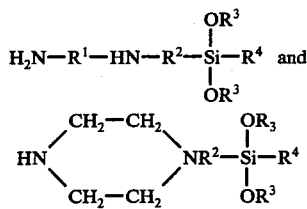

wherein:

$R^1$ is a divalent group selected from

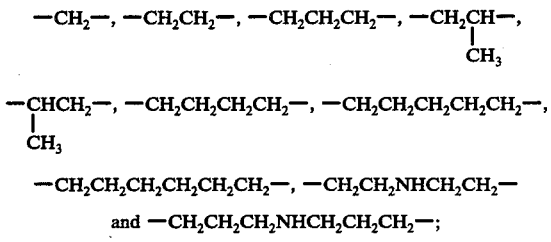

$R^2$ is a divalent group selected from

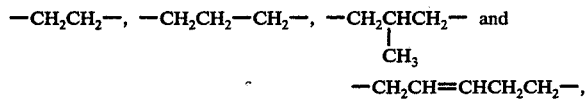

$R^3$ is any of methyl, ethyl, propyl and isopropyl; and $R^4$ is any of $R^3$ and $OR^3$, and (B) 5 – 55% by weight of a polymer or a copolymer of monomers of the general formula:

wherein X is either of hydrogen and methyl, and R is a monovalent group selected from

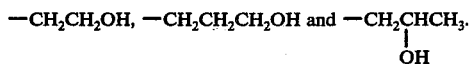

The composition of this invention is useful to form an abrasion-resistant and anti-fogging coating on the surfaces of inorganic glass, metals or known plastic materials.

DETAILED DESCRIPTION OF THE INVENTION

The cured product of hydrolysate of Component (A) gives a coating with some abrasion resistance but little fogging resistance, and the polymer or co-polymer of Component (B), which is known as the hydrophilic polymer, provides a coating poor in abrasion resistance having no practical use although being anti-fogging. But, the composition comprising these two components, when cured, forms a coating that is firmly bonded to metal, inorganic glass or transparent plastic substrates and provided with abrasion-resistance equivalent to or over that obtained when only the hydrolysate of Component (A) is cured and fogging resistance equal to that resulting from independent use of the polymer of Component (B) as well as good uniformity and transparency.

Examples of Component (A) useful in the present invention include:

N-aminomethyl-β-aminoethyltrimethoxysilane,
N-β-aminoethyl-γ-aminopropyltrimethoxysilane,
N-β-aminoethyl-γ-aminopropyltriethoxysilane,
N-β-aminoethyl-γ-aminopropyltripropoxysilane,
N-β-aminoethyl-γ-aminopropylmethyldimethoxysilane,
N-β-aminoethyl-γ-aminopropylmethyldiethoxysilane,
N-β-aminoethyl-γ-aminopropylmethyldipropoxysilane,
N-β-aminoethyl-γ-aminopropylethyldimethoxysilane,
N-β-aminoethyl-γ-aminopropylethyldiethoxysilane,
N-β-aminoethyl-γ-aminopropylethyldipropoxysilane,
N-β-aminoethyl-γ-aminopropylpropyldimethoxysilane,
N-β-aminoethyl-γ-aminopropylpropyldiethoxysilane,
N-β-aminoethyl-γ-aminopropylpropyldipropoxysilane,
N-γ-aminopropyl-γ-aminopropyltrimethoxysilane,
N-γ-aminopropyl-γ-aminopropyltriethoxysilane,
N-γ-aminopropyl-γ-aminopropyltripropoxysilane,
N-γ-aminopropyl-γ-aminopropylmethyldimethoxysilane,
N-γ-aminopropyl-γ-aminopropylmethyldiethoxysilane,
N-γ-aminopropyl-γ-aminopropylmethyldipropoxysilane, N-γ-aminopropyl-γ-aminopropylethyldimethoxysilane,
N-γ-aminopropyl-γ-aminopropylethyldiethoxysilane,
N-γ-aminopropyl-γ-aminopropylethyldipropoxysilane,
N-γ-aminopropyl-γ-aminopropylpropyldimethoxysilane,
N-γ-aminopropyl-γ-aminopropylpropyldiethoxysilane,
N-γ-aminopropyl-γ-aminopropylpropyldipropoxysilane,
N- -aminobutyl-γ-aminopropyltrimethoxysilane,
N- -aminobutyl-γ-aminopropyltriethoxysilane,
N- -aminobutyl-γ-aminopropyltripropoxysilane,
N- -aminobutyl-γ-aminopropylmethyldimethoxysilane, N--aminobutyl-γ-aminopropylmethyldiethoxysilane,
N--aminobutyl-γ-aminopropylmethyldipropoxysilane,
N--aminobutyl-γ-aminopropylethyldimethoxysilane,
N--aminobutyl-γ-aminopropylethyldiethoxysilane,
N--aminobutyl-γ-aminopropylethyldipropoxysilane,
N--aminobutyl-γ-aminopropylpropyldimethoxysilane,
N--aminobutyl-γ-aminopropylpropyldiethoxysilane,
N--aminobutyl-γ-aminopropylpropyldipropoxysilane,
γ-(1-piperazinyl)propyltrimethoxysilane,
γ-(1-piperazinyl)propyltriethoxysilane,
γ-(1-piperazinyl)propyltripropoxysilane,
γ-(1-piperazinyl)propylmethyldimethoxysilane,
γ-(1-piperazinyl)propylmethyldiethoxysilane,
γ-(1-piperazinyl)propylmethyldipropoxysilane,
γ-(1-piperazinyl)propylethyldimethoxysilane,
γ-(1-piperazinyl)propylethyldiethoxysilane,
γ-(1-piperazinyl)propylethyldipropoxysilane,
γ-(1-piperazinyl)propylpropyldimethoxysilane,
γ-(1-piperazinyl)propylpropyldiethoxysilane,
γ-(1-piperazinyl)propylpropyldipropoxysilane,
N-aminohexyl-γ-aminopropyltrimethoxysilane,
N-aminohexyl-γ-aminopropyltriethoxysilane,
N-aminohexyl-γ-aminopropyltripropoxysilane,
N-aminohexyl-γ-aminopropylmethyldimethoxysilane,
N-aminohexyl-γ-aminopropylmethyldiethoxysilane,
N-aminohexyl-γ-aminopropylmethyldipropoxysilane,
N-aminohexyl-γ-aminopropylethyldimethoxysilane,
N-aminohexyl-γ-aminopropylethyldiethoxysilane,
N-aminohexyl-γ-aminopropylethyldipropoxysilane,
N-aminohexyl-γ-aminopropylpropyldimethoxysilane,
N-aminohexyl-γ-aminopropylpropyldiethoxysilane, and
N-aminohexyl-γ-aminopropylpropyldipropoxysilane.

Component (B) of the present invention is exemplified by:
hydroxyethyl methacrylate,
hydroxyethyl acrylate,
3-hydroxypropyl methacrylate,
3-hydroxypropyl acrylate,
2-hydroxypropyl methacrylate, and
2-hydroxypropyl acrylate.

When the composition of this invention is applied and cured so as to form a coating with a thickness of from 0.5 to 0.0005 mm, preferably from 0.1 to 0.001 mm, more preferably from 0.08 to 0.005 mm, it products a coating with high fogging resistance, abrasion resistance, toughness and crack resistance.

When the thickness is over the upper limit of the above range, the coating is fragile and easily cracked, and further uniformity of the coating is impaired. Thus the composite cannot be used practically. On the other hand, when the thickness is below the above range, the resistance to abrasion or fogging is not satisfactory. That is, only when the thickness of the coating is within the above range, a composite in which the coating and the substrate are firmly bonded is obtained and it exhibits excellent combination of satisfactory degree of fogging resistance, abrasion resistance, transparency, uniformity, mechanical strengths and so forth.

In producing the composition of the present invention, a mixture of the hydrolysate of Component (A) and a polymer or a copolymer of Component (B), and in some cases Component (B) itself is first prepared. The process may be in accord with any of the following ones.

(1) Mix the hydrolysis product of Component (A) with Component (B), add a radical polymerization catalyst to the mixture and heat, or otherwise apply light or an ionizing radiation to the mixture to polymerize Component (B);

(2) Add water, a solvent, and if necessary a hydrolysis catalyst to a mixture of Components (A) and (B) to hydrolyze Component (A), add a radical polymerization catalyst to the mixture and heat the mixture, or otherwise apply light or an ionizing radiation to the mixture to polymerize Component (B);

(3) Polymerize Component (B) by heating with a radical polymerization catalyst or by applying light or an ionizing radiation, and then mix the resulting polymer of Component (B) with the hydrolysate of Component (A); and (4) Hydrolyze Component (A) in a mixture of a polymer of Component (B), Component (A), water and a solvent, if necessary with addition of a hydrolysis catalyst.

The radical polymerization catalysts used in the present invention include any radical initiator capable of initiating polymerization of usual radically polymerizable monomers, such as peroxides, hydroperoxides, dinitriles, redox catalysts and the like. The term "light" or "ionizing radiation" used herein includes visible or ultraviolet rays from a low pressure or high pressure mercury lamp, sunbeam, α-rays, β-rays, γ-rays, electron beams, X-rays, neutron beams, mixed radioactive rays emitted from a nuclear reactor. The wavelength of the light may be within a range of 1500 – 7000Å and the radiation can be applied at a dose rate within a range of $1 \times 10^2 - 5 \times 10^9$ rad per hour.

The composition of this invention may preferably be prepared by polymerization of Component (B) by means of light or an ionizing radiation. The thus prepared product gives especially good results.

The hydrolysis of neat Component (A) or Component (A) in admixture with Component (B) can be effected by adding water, a water-soluble solvent such as methanol, ethanol, propanol, isopropanol, dioxane, acetone, methyl ethyl ketone and the like and, if necessary, a small amount of hydrolysis catalyst such as sulfuric acid, hydrochloric acid, chlorosulfonic acid, sulfuryl chloride, iron chloride, ethyl borate, naphthenic acid salts, ammonia, caustic potash or caustic soda. This reaction is advanced until the viscosity of the reaction system reaches about 20 – 500 cp and partial gelation does not yet occur.

The coating composition of the present invention can be cured by heating it with the addition of a curing catalyst. The curing catalysts used in this invention are those necessary for the reactions which take place when a mixture of a hydrolysate of Component (A) and a polymer of Component (B) is applied on a substrate and heated to cure the film. Specifically, the catalysts are exemplified by sulfuric acid, hydrochloric acid, chlorosulfonic acid, p-toluenesulfonic acid, trichloroacetic acid, phosphoric acid, polyphosphoric acid, pyrophosphoric acid, iodic anhydride, hydrogen bromide, iodine, bromine, stannic chloride, boron trifluoride, perchloric acid, periodic acid, cobalt laurate, cobalt naphthenate, zinc octylate, triphenoxyboron, caustic soda, caustic potash, ammonia, etc. These curing catalysts may be added to the above mixture of the hydrolysate of Component (A) and the polymer (including copolymer) of Component (B) at any stage of the preparation including after the preparation.

The mixing ratio of the hydrolysate of Component (A) and the polymer of Component (B) employed in the present invention may vary without any restriction. In order to obtain the combination effect, however, the hydrolysate of Component (A) may occupy 95 – 45%, preferably 90 – 95% by weight and more preferably 80 – 60% by weight of the mixture of Component (A) and (B). The curing catalyst may preferably be added in an amount of 0.05 – 10% by weight, more preferably 0.1 – 5% by weight on the basis of the total weight of Components (A) and (B).

According to the invention, the thermosetting resin composition prepared by the aforementioned procedures with the above mixing ratio is applied on the surface of metal, inorganic glass or transparent plastics to form a film, which can be cured by heating to 60° – 200° C or by applying both heat and an ionizing radiation. The cured film is intimately and integrally united with the substrate to provide a coated composite.

In this specification, all the percentages, ratios and parts are those on the basis of weight.

Examples of inorganic glass substrates to which the composition of the invention is applicable to form a composite with effective fogging resistance and good abrasion resistance are tempered glass, quartz glass, glass laminate, ultraviolet- or infrared-absorbing glass, sodium silicate glass, potassium silicate glass, flint glass, crystal glass, crown glass, optical glass, glass fiber, transparent ceramics and the like. This means that the present composition is applicable to all kinds of glass or transparent ceramics which are now generally used. The substrate materials useful in the present invention include mirrors formed by adhesion of a thin layer of metal to one surface of the above listed glasses, transparent composite materials produced by bonding a thin transparent plastic layer to one surface of the above listed glasses, a transparent composite material formed by sandwiching a transparent plastic layer between the two sheets of glass, a transparent material comprising two or more joined glasses or transparent ceramics and the like.

Also following are examples of the transparent plastic materials to which the composition of this invention can be suitably applied to form composites having surfaces with excellent fogging resistance and abrasion resistance.

Cellulose acetate, polycarbonates, polydiethyleneglycol bis-allylcarbonate, polytriethyleneglycol bis-allylcarbonate, polyethyleneglycol bis-allylcarbonate, polytetraethyleneglycol bis-allylcarbonate, polypropyleneglycol bis-allylcarbonate, polyesters, polystyrene, poly-α-methylstyrene, polymethyl methacrylate, polymethyl acrylate, polyethyl methacrylate, polyethyl acrylate, polybutyl methacrylate, polybutyl acrylate, polyglycidyl methacrylate, polyglycidyl acrylate, poly-2-ethylhexyl methacrylate, polybenzyl methacrylate, allylbenzenephosphonate polymer, allylbenzenphosphate polymer, polydiethyleneglycol diacrylate, polytriethyleneglycol dimethacrylate, polytriethyleneglycol diacrylate, polytetraethyleneglycol dimethacrylate, polytetraethyleneglycol diacrylate, polypropyleneglycol dimethacrylate, polypropyleneglycol diacrylate, polytrimethylolpropane trimethacrylate, polyhexanediol monomethacrylate, polyhexanediol monoacrylate, polybutanediol monomethacrylate, polybutanediol monoacrylate, polypentanediol monomethacrylate, polypentanediol monoacrylate and co-polymers thereof.

Mirror materials formed by bonding a thin layer of metal to one surface of a plate of the abovementioned polymers or co-polymers, transparent materials made of the above polymers or co-polymers with a thin layer of inorganic glass bonded to one surface thereof, transparent materials made by bonding two or more of the above polymers and/or co-polymers, or materials formed from the above mentioned polymers or copolymers by reinforcing with fibers or beads of plastics, inorganic glass, etc. which do not impair transparency of the materials etc. are also employable as the substrates of the present invention.

In the examples hereinbelow, measurement of abrasion resistance by the sand-falling method were carried out as follows. The instrument according to ASTM D-673-44 was used and 1380 g of a sand defined in JIS K5491 (Soma Sand) was dropped on the surface to be tested, and "haze" was determined according to ASTM D1003-61, by which abrasion resistance is evaluated. Under these conditions, the haze values of the transparent resins of which abrasion resistance is established to be excellent in the art are as follows:

Diethyleneglycol bis-allylcarbonate polymer (CR-39) (used in Example 5, 6, 7 and 10) . . . 27%

Polymethyl methacrylate (used in Example 8) . . . 63%

A co-polymer of butyl acrylate, methyl methacrylate, glycidyl methacrylate and tetraethyleneglycol dimethacrylate (used in Example 9) . . . 75%

The so-called pencil hardness of the surface was measured according to JIS K-5651 in comparison with the lead of the standard pencils. Diethyleneglycol bis-allylcarbonate polymer, for instance, had a hardness of 3H.

The estimation of fogging resistance was conducted by observing whether fogging due to dewdrops occurs when a test sample which has been maintained at −5° C for a long time is placed in a chamber kept at 25° C and R.H. 85%. Substrate plastics not having the present anti-fogging coating underwent remarkable fogging in this test without any exception.

EXAMPLE 1

Fifty (50) ml. of N-β-aminoethyl-γ-aminopropyl-trimethoxysilane, 30 ml. of water, 80 ml. of ethanol and 0.05 ml. of hydrochloric acid were mixed, and a hydrolysis reaction was allowed to proceed at room temperature for 5 hours. Ten parts of 2-hydroxyethyl methacrylate were added to 90 parts of the resulting hydrolysis product, and a total of $2 \times 10^6$ roentgens of γ-rays emitted from cobalt 60 was applied to the mixture at a dose rate of $1 \times 10^6$ roentgens per hour. To this irradiated mixture 0.5% of zinc octylate was added, and the mixture was applied on a 2 mm thick glass lens, which was heated at 100° C for one hour and then at 60° C for 24 hours to produce a transparent composite lens having a surface coating the thickness of which was 0.006 mm.

The light transmission of this lens was 92.7%, the haze value measured after the sand-falling test was 13.9%, and no fogging was observed in the fogging test.

EXAMPLE 2

The procedure in Example 1 was followed except that the mixing ratio of 2-hydroxyethyl methacrylate to the hydrolysate of N-β-aminoethyl-γ-aminopropyltrimethoxysilane was 80 : 20, and there was obtained a transparent composite lens with a 0.08 mm thick coating on the surface.

The light transmission of this coated composite lens was 92.0%, and the haze value after the sand-falling test was 14.8%. No fogging was observed on the surface in the fogging test.

EXAMPLE 3

One hundred (100) ml. of N-β-aminoethyl-γ-aminopropylmethyldimethoxysilane, 20 ml. of water, 80 ml. of dioxane and 0.04 ml. of hydrochloric acid were mixed, and the mixture was subjected to hydrolysis at 50° C for 48 hours. Seventy (70) parts of the hydrolysis product was taken and was mixed with 30 parts of 2-hydroxyethyl acrylate, followed by addition of 0.5% each of potassium persulfate and dimethylaniline and heated at 45° C for 10 hours. Cobalt naphthenate (0.4%) was added to the resulting mixture, and the mixture was applied on a 3 mm thick glass sheet, which was then heated at 150° C for 50 minutes and then at 80° C for 10 hours to produce a transparent composite board with a 0.05 mm thick coating on the surface.

The light transmission of this composite board was 91.8%, and the haze value after the sand-falling test was 24.5%. The surface had no fogging in the fogging test.

EXAMPLE 4

Water (30 ml.), methanol (80 ml.) and p-toluenesulfonic acid (0.05 g) were added to 70 ml. of N-aminomethyl-β-aminoethyltrimethoxysilane, and then the mixture was hydrolyzed at room temperature for 8 hours. Separately, 3 × 10⁶ rad of electron beams for an electron accelerator of an energy of 3.0 MeV was applied to a mixture of 50 ml. of 3-hydroxypropyl methacrylate and 100 ml. of isopropanol for polymerization and the polymer was collected. Fifty parts of this polymer was mixed with 50 parts of the above hydrolysis product until a complete solution was obtained, and the solution was applied on the glass surface of a mirror after addition of 0.5% each of zinc octylate and triphenoxyboric acid. After heating at 100° C for 60 minutes and then at 60° C for 60 hours, there was given a composite mirror having a coating about 0.009 mm thick.

The pencil hardness of the composite was 6H, and no fogging was observed in the fogging test.

EXAMPLE 5

To 50 ml. of N-β-aminoethyl-γ-aminopropyltrimethoxysilane were added 15 ml. of water, 35 ml. of ethanol and 0.025 ml. of hydrochloric acid, and then the hydrolysis reaction was conducted at room temperature for 5 hours. 2-hydroxyethyl methacrylate was added to this hydrolysate at a part ratio of 10 : 90, and 2 × 10⁶ roentgens of γ-rays emitted from cobalt 60 was applied to the mixture at a dose rate of 1 × 10⁶ roentgens/hour at room temperature. Zinc octylate (0.5%) was added to the inadiated product to give a curable composition which was then applied by the immersion method on the surface of a lens made of diethyleneglycol bisallylcarbonate polymer and having a diameter of 7.4 cm and a thickness of 2.5 mm. The lens was heated at 100° C for 1 hour and then at 60° C for 24 hours to provide with a transparent composite lens coated with a 0.005 mm thick coating.

The light transmission of this composite lens was 91.5% which was the same as of the substrate polymer. The haze value after the sand-falling test was 20.8%, and its pencil hardness was 4H. Further, no fogging was observed on the surface in the fogging test.

EXAMPLE 6

The procedure of Example 5 was followed, but the ratio of 2-hydroxyethyl methacrylate to the hydrolysate of N-β-aminoethyl-γ-aminopropyltrimethoxysilane being 80 : 20 in part, and there was produced a transparent composite lens having a coating about 0.1 mm thick on the surface.

The light transmission of the above coated composite lens was 92.4% equivalent to that of the substrate polymer, and the haze value in the sand-falling test was 15.6%. The pencil hardness was 6H, and no fogging was observed on the surface in the fogging test.

EXAMPLE 7

N-β-aminoethyl-γ-aminopropylmethyldimethoxysilane (100 ml.), water (30 ml.), dioxane (70 ml.) and hydrochloric acid (0.05 ml.) were mixed and then hydrolyzed at 40° C for 48 hours. Eighty parts of the resulting hydrolysate and 20 parts of 2-hydroxyethyl acrylate was mixed followed by addition of 0.5% of benzoyl peroxide, and then heated at 60° C for 4 hours. To the mixture was added 0.5% of cobalt naphthenate to produce a curable composition, which was applied on a 3 mm thick sheet of diethyleneglycol bisallylcarbonate polymer. After the sheet was heated at 90° C for 16 hours, a transparent composite sheet with a 0.01 mm thick coating on its surface was produced.

The light transmission of this composite sheet was 92.0% equivalent to that of the substrate polymer, and the haze value was 25.1% when it was measured by the sand-falling test. In the fogging test, it was observed that the conposite board had good fogging resistance, and no fogging was observed on the surface.

EXAMPLE 8

A mixture of 100 ml. of N-β-aminoethyl-γ-aminopropyltriethoxysilane, 50 ml. of water, 100 ml. of acetone and 0.05 ml. of sulfuric acid was hydrolyzed at 60° C for 48 hours. Fifty parts of this hydrolysis product was mixed with 50 parts of 3-hydroxypropyl methacrylate, and then 3 × 10⁶ rad of electron beams from an electron accelerator of an energy of 2.5 MeV was applied to the mixture. To the irradiated product was added 0.5% of perchloric acid, and then the mixture was applied on a 2 mm thick methyl methacrylate polymer sheet, followed by heating at 100° C for 60 minutes and then at 60° C for 48 hours. Thus a transparent composite sheet with a 0.08 mm thick coating on the surface was produced.

The light transmission of this composite sheet was 92.5%, which equals that of the substrate polymer, and the surface had no fogging in the fogging test. The haze value in the sand-falling test was 29.0%.

EXAMPLE 9

Water (30 ml.), methanol (70 ml.) and p-toluenesulfonic acid (0.05 g) were added to 50 ml. of N-γ-aminopropyl-γ-aminoβ-methylpropyltrimethoxysilane, and the resulting mixture was hydrolyzed at room temperature for 10 hours. Separately, to a mixture of 50 ml. of 2-hydroxyethyl methacrylate, 50 ml. of 3-hydroxypropyl acrylate and 100 ml. of ethanol was applied 1 × 10⁶ roentgens of γ-rays emitted from cobalt 60 at a dose rate of 5 × 10⁵ roentgens/hour at room temperature for copolymerization. Then the resulting co-polymer was collected.

The above hydrolysate and the co-polymer were mixed at a ratio of 70 : 30 in part until a homogeneous solution was obtained, and then 0.5% of cobalt naphthenate was added to this solution. The mixture was applied on a butyl acrylatemethyl methacrylate-glycidyl methacrylate-tetraethyleneglycol dimethacrylate co-polymer sheet follows by heating at 100° C for 30 minutes and then at 60° C for 24 hours to produce a transparent composite sheet having an about 0.007 mm thick coating.

The light transmission of this composite sheet was 91.0%, which equals that of the substrate co-polymer, the haze value in the sand-falling test was 24.9%, and no fogging was observed in the fogging test.

EXAMPLE 10

The procedure in Example 5 was followed, but a mirror made by bonding a 3 mm thick plate of the diethyleneglycol bis-allylcarbonate polymer used in Example 5 to a thin layer of a chrome-plated metal being substituted for the lens of diethyleneglycol bis-allylcarbonate and the composition being applied on the surface of the polymer plate opposite to the thin metal layer, there was obtained a composite mirror with a 0.006 mm thick coating on the surface.

The pencil hardness of this composite mirror was 6H, and no fogging was observed in the fogging test.

EXAMPLE 11

To a mixture of 90 parts of the hydrolysate of N-β-aminoethyl-γ-aminopropyltrimethoxysilane produced in Example 1 and 10 parts of hydroxyethyl methacrylate was applied 2 × 10⁶ roentgens of γ-rays emitted from cobalt 60 at a dose rate of 1 × 10⁶ roentgens per hour at room temperature, and then 0.5% of zinc octylate was added to the resulting mixture to produce a curable resin composition, which was applied by spraying on the surface of a colored steel plate useful as an interior building material. Then the plate was heated at 100° C for 1 hour and then at 60° C for 24 hours, causing formation of a 0.002 mm thick coating on the surface.

No fogging was observed in the fogging test. As to the surface abrasion resistance, the surface was rubbed with steel wool, but it was not scratched. Thus, the surface of the colored steel plate coated with the present thermosetting resin composition is hardly scratched, and the advantages as interior decoration materials are not imparied because of dew-collection even in the atmosphere at an elevated temperature and high humidity. This means that the colored steel plate is an excellent building interior material.

EXAMPLE 12

Electron beams (3 × 10⁶ rad) emitted from an electron accelerator of an energy of 2.5 MeV was applied at room temperature to a mixture of 50 parts of the hydrolysate of N-β-aminoethyl-γ-aminopropyltriethoxysilane produced in Example 8 and 50 parts of 3-hydroxypropyl methacrylate. . Then 0.5% of perchloric acid was added to the irradiated mixture, and the mixture was applied by spraying on a mirror of a chrome-plated 1 mm thick iron plate, followed by heating 100° C for 60 minutes and then at 24 hours to form an about 0.01 mm thick coating on the mirror surface.

When rubbed with steel wool this coating was not scratched, and no fogging was observed in the fogging test. Thus, the mirror with this coating was found not to have a drawback to collect dewdrops on the surface, and therefore to be satisfactory as a mirror material.

We claim:

1. A thermosetting resin composition forming transparent, anti-fogging abrasion-resistant coating comprising a mixture of:

A. 95 – 45% by weight of the hydrolysate of an alkoxysilane represented by either of the general formulas:

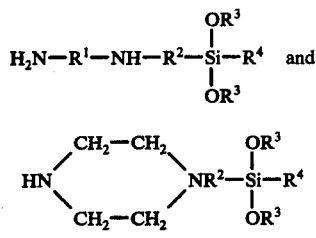

wherein:
   R¹ is a divalent group selected from

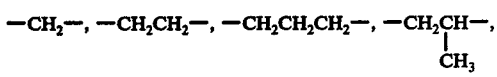

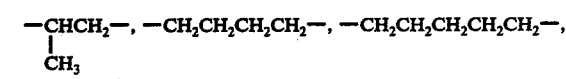

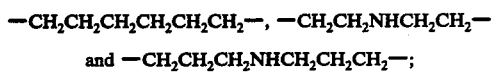

R² is a divalent group selected from

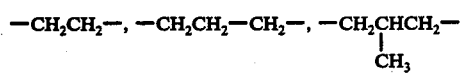

R³ is any of methyl, ethyl, propyl and isopropyl; and R⁴ is either of R³ and OR³, and B. 5 – 55% by weight of a polymer or copolymer of monomers of the general formula:

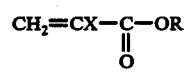

wherein:
   X is either of hydrogen and methyl; and
   R is a monovalent group selected from

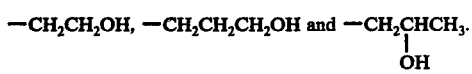

2. The thermosetting resin composition as claimed in claim 1, comprising a mixture of:

A. 90 – 50% by weight of the hydrolysate of an alkoxysilane represented by the general formula:

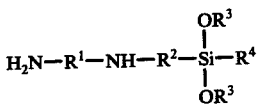

wherein:
R¹ is a divalent group selected from

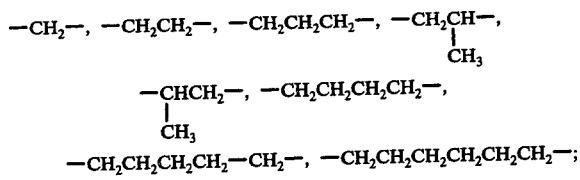

R² is a divalent group selected from

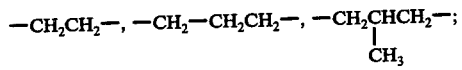

R³ is any of methyl, ethyl, propyl and isopropyl; and
R⁴ is either of R³ as defined above and OR³, and
B. 10 – 50% by weight of a polymer or copolymer of monomers of the general formula:

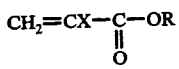

wherein:
X is either of hydrogen and methyl; and
R is a monovalent group selected from

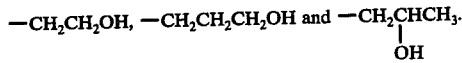

3. The thermosetting resin composition as claimed in claim 2, comprising a mixture of:
A. 90 – 50% by weight of the hydrolysate of an alkoxysilane represented by the general formula:

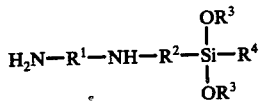

wherein:
R¹ is a davalent group selected from —CH₂—, —CH₂CH₂—, —CH₂CH₂CH₂—;
R² is a divalent group selected from

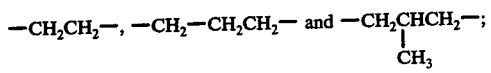

R³ is any of methyl, ethyl and propyl; and
R⁴ is any of R³ as defined above and OR³, and
B. 10 – 50% by weight of a polymer or copolymer of monomers of the general formula:

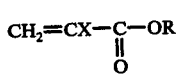

wherein:
X is either of hydrogen and methyl; and
R is a monovalent group selected from —CH₂CH₂OH, and —CH₂CH₂CH₂OH.

4. The thermosetting, resin composition as claimed in claim 3, wherein said mixture comprises (A) 80 – 60% by weight of the hydrolysate of said alkoxysilane and (B) 20 – 40% by weight of a polymer or copolymer of said monomers.

5. The thermosetting resin composition as claimed in claim 1, wherein the monomer has been polymerized by irradiation of light or an ionizing radiation.

6. The thermosetting resin composition as claimed in claim 2, wherein the monomer has been polymerized by irradiation of light or an ionizing radiation.

7. The thermosetting resin composition as claimed in claim 3, wherein the monomer has been polymerized by irradiation of light or an ionizing radiation.

8. The thermosetting resin composition as claimed in claim 4, wherein the monomer has been polymerized by irradiation of light or an ionizing radiation.

9. A composite comprising a substrate of a material selected from a group consisting of inorganic glasses, transparent organic synthetic resins and metals and a coating of a cured mixture comprising:
A. 95 – 45% by weight of the hydrolysate of an alkoxysilane represented by either of the general formulas:

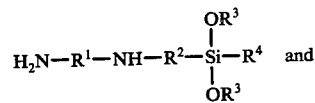

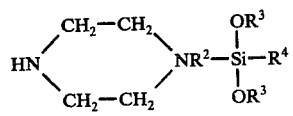

wherein:
R¹ is a divalent group selected from

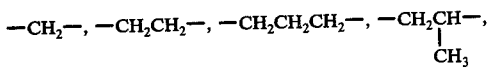

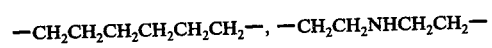

R² is a divalent group selected from

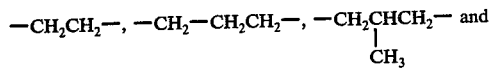

R³ is any of methyl, ethyl, propyl and isopropyl; and
R⁴ is any of R³ and OR³, and
B. 5 – 55% by weight of a polymer or a copolymer of monomers of the general formula:

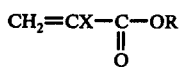

wherein:
X is either of hydrogen and methyl, and
R is a monovalent group selected from

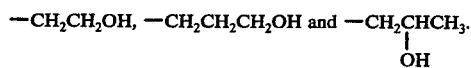

10. The composite as claimed in claim 9, wherein said mixture comprises:
A. 90 – 50% by weight of the hydrolysate of an alkoxysilane represented by the general formula:

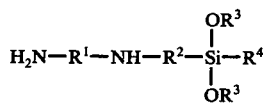

wherein:
$R^1$ is a divalent group selected from $-CH_2-$, $-CH_2CH_2-$, $-CH_2CH_2CH_2-$, $-CH_2CH-$,
$\phantom{-CH_2-, -CH_2CH_2-, -CH_2CH_2CH_2-, -}CH_3$ $-CHCH_2-$, $-CH_2CH_2CH_2CH_2-$,
$\phantom{-}CH_3$ $-CH_2CH_2CH_2CH_2-CH_2-$, $-CH_2CH_2CH_2CH_2CH_2CH_2-$;

$R^2$ is a divalent group selected from

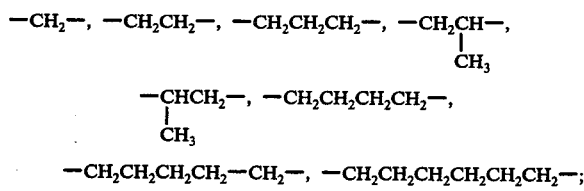

$R^3$ is any of methyl, ethyl, propyl and isopropyl; and
$R^4$ is either of $R^3$ as defined above and $OR^3$; and
B. 10 – 50% by weight of a polymer or copolymer of monomers of the general formula:

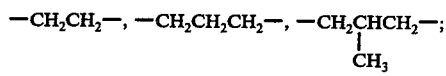

wherein:
X is either of hydrogen and methyl; and
R is a monovalent group selected from

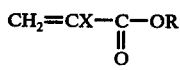

11. The composite as claimed in claim 10, wherein said mixture comprises:
A. 90 – 50% by weight of the hydrolysate of an alkoxysilane represented by the general formula:

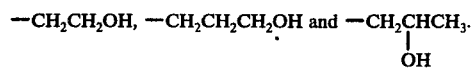

wherein:
$R^1$ is a divalent group selected from $-CH_2-$, $-CH_2CH_2-$, $-CH_2CH_2CH_2-$;
$R^2$ is a divalent group selected from

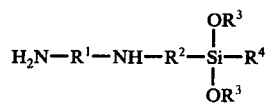

$R^3$ is any of methyl, ethyl and propyl; and
$R^4$ is either of $R^3$ as defined above and $OR^3$; and
B. 10 – 50% by weight of a polymer or copolymer of the general formula:

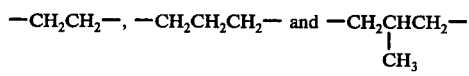

wherein:
X is either of hydrogen and methyl; and
R is a monovalent group selected from

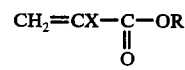

12. The composite as claimed in claim 11, wherein said mixture comprises: (A) 80 – 60% by weight of the hydrolysate of said alkoxysilane and (B) 20 – 40% by weight of said polymer or copolymer.

13. The thermosetting resin composition as claimed in claim 1, wherein $R^2$ is selected from the group consisting of

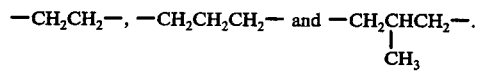

14. A composite as claimed in claim 9, wherein $R^2$ is selected from the group consisting of

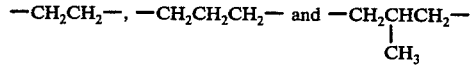

* * * * *